United States Patent
Fulli et al.

(10) Patent No.: US 9,154,415 B1
(45) Date of Patent: Oct. 6, 2015

(54) PARALLEL PROCESSING FOR LOW LATENCY NETWORK ADDRESS TRANSLATION

(71) Applicant: Cisco Technology, Inc., San Jose, CA (US)

(72) Inventors: Alessandro Fulli, San Jose, CA (US); Putu Harry Subagio, Cupertino, CA (US); Chih-Tsung Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 57 days.

(21) Appl. No.: 13/755,438

(22) Filed: Jan. 31, 2013

Related U.S. Application Data

(60) Provisional application No. 61/702,327, filed on Sep. 18, 2012.

(51) Int. Cl.
*H04L 12/741* (2013.01)
*H04L 29/06* (2006.01)

(52) U.S. Cl.
CPC ............ *H04L 45/74* (2013.01); *H04L 29/0653* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,791,947 B2* | 9/2004 | Oskouy et al. | 370/238 |
| 6,938,097 B1* | 8/2005 | Vincent et al. | 709/240 |
| 6,985,446 B1 | 1/2006 | Hurtta et al. | |
| 7,453,874 B1* | 11/2008 | Nguyen | 370/389 |
| 7,583,668 B1 | 9/2009 | Mayes et al. | |
| 7,656,818 B1 | 2/2010 | Baroudi et al. | |
| 7,814,232 B2 | 10/2010 | Satapati et al. | |
| 7,830,793 B2 | 11/2010 | Gai et al. | |
| 7,961,621 B2 | 6/2011 | Bergamasco et al. | |
| 7,969,971 B2 | 6/2011 | Gai et al. | |
| 7,986,703 B2 | 7/2011 | Phadnis et al. | |
| 8,208,389 B2 | 6/2012 | Alaria et al. | |
| 8,640,036 B2 | 1/2014 | Pignataro et al. | |
| 2002/0003795 A1* | 1/2002 | Oskouy et al. | 370/389 |
| 2003/0005103 A1* | 1/2003 | Narad et al. | 709/223 |
| 2003/0076830 A1* | 4/2003 | Asano | 370/392 |
| 2005/0141513 A1* | 6/2005 | Oh et al. | 370/395.3 |
| 2005/0195813 A1* | 9/2005 | Ambe et al. | 370/389 |
| 2006/0092947 A1* | 5/2006 | O'Keeffe et al. | 370/395.31 |
| 2006/0120373 A1* | 6/2006 | O'Keeffe et al. | 370/392 |

OTHER PUBLICATIONS

T. Stevenson, [c-nsp] SUP32 Memory upgrade, May 2, 2004, pp. 1-2.*
A. Rijsinghai, RFC 1624: Computation of the Internet Checksum via Incremental Update, May 1994, pp. 1-6.*
Author Unknown, Configuring NAT, pp. 1-4, as archived by the internet archive, www.archive.org, on May 28, 2010.*
Cisco Systems, Inc., "Configuring Network Address Translation: Getting Started," www.cisco.com, Document ID: 13772, Mar. 16, 2006.
Cisco Systems, Inc., "How NAT Works," www.cisco.com, Document ID: 6450, Mar. 29, 2011.

* cited by examiner

*Primary Examiner* — Christopher Crutchfield

(74) *Attorney, Agent, or Firm* — Edell, Shapiro & Finnan, LLC

(57) ABSTRACT

A packet is received at an ingress port of a networking device and a forwarding result that identifies an egress port for the packet is generated. In parallel with the generation of the forwarding result, a network address translation (NAT) result that identifies one or more NAT rules for possible application to the packet is generated. The forwarding result and the NAT result are then used to generate a routing decision result.

30 Claims, 10 Drawing Sheets

PARALLEL PROCESSING FOR LOW LATENCY NETWORK ADDRESS TRANSLATION

CROSS-REFERENCE TO RELATED APPLICATIONS

This application claims the benefit of U.S. Provisional Patent Application No. 61/702,327 filed on Sep. 18, 2012. The content of this provisional application is hereby incorporated by reference herein.

TECHNICAL FIELD

The present disclosure relates to latency in a networking device.

BACKGROUND

In computing networks, data is transmitted from a source to a destination in the form of packets. These packets generally pass through one or more networking devices, such as switches, routers, firewalls, etc. Certain customers, such as those in the financial sector, demand network architectures that provide low latency and high integration with low costs. The latency of a networking device is the difference between the arrival time and the departure time of a packet. As such, latency may be measured as the time between the time a first bit of a packet (i.e., the packet head) arrives at an ingress port and the time that the first bit of the packet departs from an egress port.

Networking devices may perform one or more operations that introduce latency into the packet transmission process. These operations may include, for example, layer 2 (L2) and/or layer 3 (L3) forwarding, Network Address Translation (NAT), and L2/L3/layer 4 (L4) access control list (ACLs) operations.

DESCRIPTION OF EXAMPLE EMBODIMENTS

Overview

In accordance with examples presented herein, a packet is received at an ingress port of a networking device and a forwarding result that identifies an egress port for the packet is generated. In parallel with the generation of the forwarding result, a network address translation (NAT) result that identifies one or more NAT rules for possible application to the packet is generated. The forwarding result and the NAT result are then used to generate a routing decision result.

Example Embodiments

Figure 1:
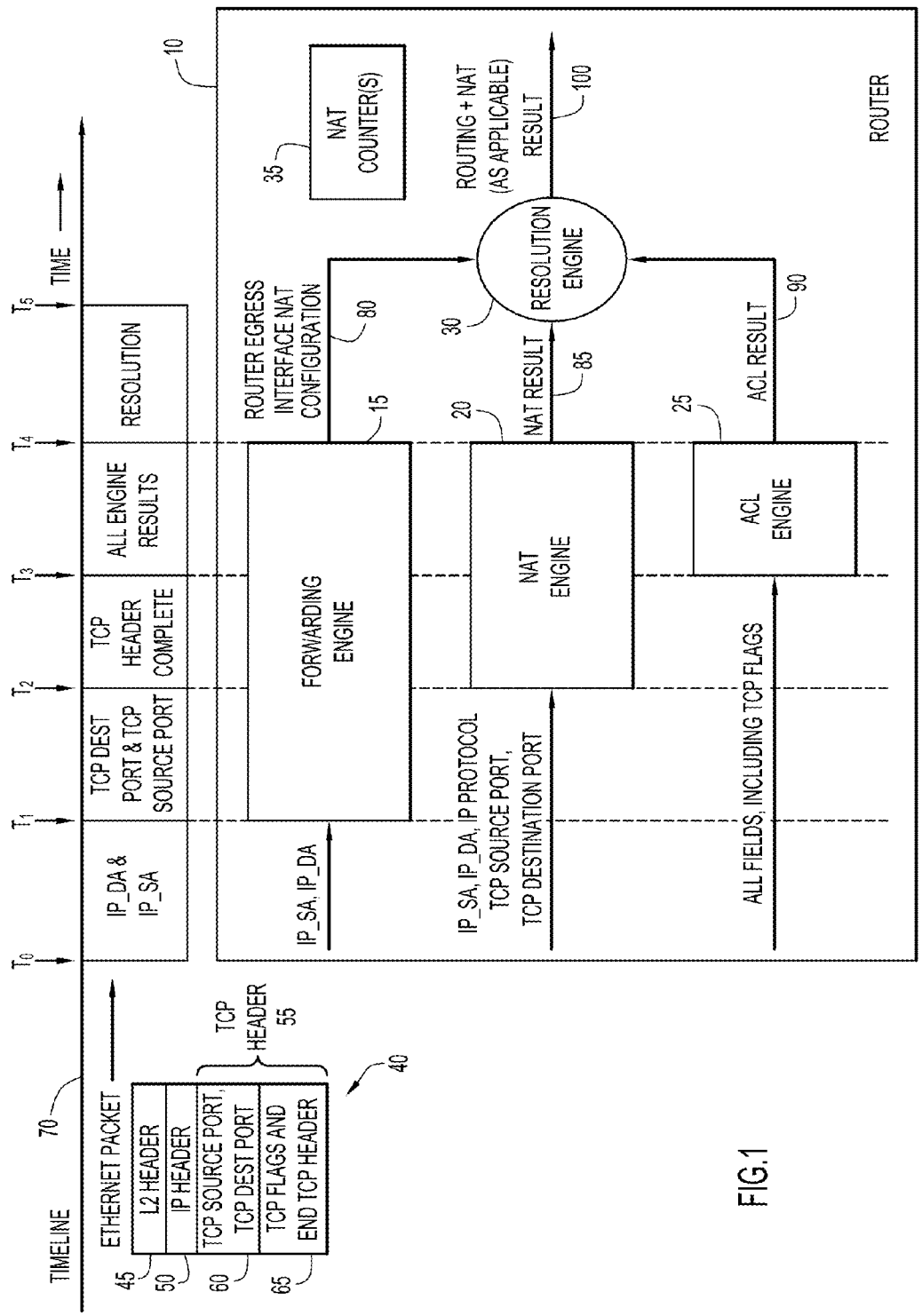
FIG. 1 is a schematic diagram of a networking device configured to perform parallel processing operations in accordance with examples presented herein.

FIG. 1 is a block diagram of a network device 10 such as a multi-layer switch, router, etc., configured to perform parallel processing operations in accordance with examples presented herein. In the example of FIG. 1, networking device 10 is a router that includes a forwarding engine 15, a network address translation (NAT) engine 20, an access control list (ACL) engine 25, a resolution engine 30, and one or more NAT counters 35. It is to be appreciated that router 10 may include one or more other elements (e.g., processor, application specific integrated circuit(s), network interface ports, etc.) that, for ease of illustration, have been omitted from FIG. 1.

Also shown in FIG. 1 is a packet 40 that, in this example, is an Ethernet packet. Packet 40 includes an L2 header 45, an L3 or Internet Protocol (IP) header 50, and an L4 or Transmission Control Protocol (TCP) header 55. The L2 header 45 includes destination and source media access control (MAC) addresses while the IP header 50 includes L3 addresses in the form of a destination IP address (IP_DA) and a source IP address (IP_SA).

In accordance with the TCP, a data stream is segmented and TCP header 55 is added to create a TCP segment. The TCP segment is then encapsulated into an IP datagram. In the example of FIG. 1, TCP header 55 includes, among other information, TCP port information 60, and TCP flags 65. The TCP port information 60 comprises a TCP source port number (TCP source port) and a TCP destination port number (TCP destination port). The TCP flags 65 may include the Nonce Sum (NS) flag (1 bit), the Congestion Window Reduced (CWR) flag (1 bit), the Explicit Congestion Notification (ECN) echo (ECE) flag, the urgent pointer (URG) flag (1 bit), the Acknowledgment (ACK) flag (1 bit), the Push (PSH) flag (1 bit), the reset (RST) flag (1 bit), the Synchronize sequence numbers (SYN) flag (1 bit), and the Finished (FIN) flag (1 bit). The TCP header 55 may also include other information as is known in the art.

In operation, router 10 includes a plurality of network interface ports (not shown in FIG. 1). Packet 40 is received at one of these ports and the receiving port is referred to as the ingress port or ingress. As the packet 40 is received at the ingress port, the information (L2 header 45, IP header 50, and TCP header 55) in packet 40 will become available for use by router 10 in routing the packet 40.

Due to the structure of packet 40, the information contained therein will become available for use by router 10 at different times. FIG. 1 includes a timeline 70 that illustrates when various pieces of information in packet 40 become available for use by router 10. As shown in timeline 70, the first information available for use by router 10 is the L3 information that includes the source and destination IP addresses. The point in time at which the source and destination IP addresses are available is shown at $T_1$. The time that the packet 40 is received by the router 10 is shown at $T_0$.

Timeline 70 further illustrates that the availability of the IP source and destination addresses is followed by the availability of TCP source and destination port numbers at $T_2$. Subsequently, the complete TCP header (including the TCP flags) becomes available at $T_3$. As described further below, the techniques presented herein primarily use the source and destination IP address, TCP source and destination port numbers, and TCP flags. As such, the availability of these specific pieces of information is explicitly shown in timeline 70. It is to be appreciated that other pieces of information, such as L2 information, may also become available to router 10 after $T_0$. Accordingly, the timeline 70 illustrates the relative order at which the above source and destination IP addresses, TCP source and destination port numbers, and TCP flags are received and may not represent the complete timeline for the availability of information in packet 40 (i.e., other information may be received prior to, at the same time as, or after any of the source and destination IP address, TCP source and destination port numbers, and TCP flags).

The packet processing techniques presented herein leverage the fact that the information in the packet 40 is received, and becomes available, in a particular sequence so as to reduce latency in packet processing. More specifically, as described below, the router 10 is configured to implement several traditionally serial processing operations in parallel to expedite routing processing of packet 40. Also as described further below, the start of each of these parallel processing operations occurs immediately upon the receipt and availability of the relevant information in packet 40 (i.e., the information used in the respective processing operations), rather than waiting until the entire packet 40 is received and all information is available.

FIG. 1 illustrates an example arrangement that uses three parallel packet processing operations that include forwarding, NAT, and ACL. The forwarding operations are performed by forwarding engine 15, the NAT operations are performed by NAT engine 20, and the ACL operations are performed by ACL engine 25. The forwarding operations of forwarding engine 15 are, in essence, operations to identify or determine an egress port for packet 40. These forwarding operations are performed using L3 information, including the IP source and destination addresses of packet 40. These operations may include accessing a series of forwarding tables (not shown in FIG. 1). As noted above, the IP source and destination addresses of packet 40 are received and available at $T_1$, prior to the receipt and availability of the L4 information (e.g., the TCP header). As such, in the example of FIG. 1, the forwarding engine 15 is configured to begin the forwarding operations substantially immediately after the IP source and destination addresses of packet 40 are available. In other words, the forwarding operations begin approximately at, or immediately after, $T_1$.

The forwarding operations of the forwarding engine 15 generate a forwarding result 80 that is provided to the resolution engine 30. The forwarding result 80 identifies the egress interface for packet 40 and, as described further below, whether the packet 40 should undergo NAT. The forwarding result 80 may have a number of different formats. In certain examples, the forwarding result 80 may be one or more bits that are forwarded to, and used by, the resolution engine 30.

In certain circumstances, a router or other networking device functions as an agent between a public or external network (e.g., the Internet) and a private or internal network (e.g., a local area network (LAN)). In such circumstances, the computing devices connected to the internal network have unique IP addresses that are used for communications within the internal network. However, all of the computing devices connected to the internal network are represented to the external network using a single assigned IP address. As a result of this configuration, when a packet is routed from an inside interface/port (i.e., an interface attached to the internal network) to an outside interface/port (i.e., an interface attached to the external network), or vice-versa, the router performs NAT. NAT includes the changing of one or more fields in a packet so that the packet is able to reach its intended destination. The fields that may be changed during NAT include, for example: (1) the source IP address of the packet, (2) the destination IP address of the packet, (3) the TCP or L4 source port number, and (4) the TCP or L4 destination port number. A packet that is routed from an internal interface to an external interface, or vice versa, is referred to as crossing an NAT border (i.e., the packet undergoes a NAT crossing).

The NAT operations of NAT engine 20 do not include the actual translation of any of the above fields in packet 40. Rather, the NAT operations at NAT engine 20 include the generation of one or more NAT rules that may be applicable to packet 40 if the packet is to be routed from an internal interface to an external interface, or vice versa. More specifically, the forwarding engine 15 is configured to determine the egress interface for packet 40, thereby determining if the packet is to undergo a NAT crossing. As such, the NAT engine 20 does not perform the actual field translations (because it does not know if a NAT crossing will occur), but rather determines or sets one or more NAT rules for use by resolution engine 30 in performing the NAT, if applicable. The NAT engine 20 provides a NAT result 85 to resolution engine 30 that identifies the one or more NAT rules that may be applied to packet 40. The NAT result 85 may have a number of different formats. In certain examples, the NAT result 85 may be one or more bits that are forwarded to, and used by, the resolution engine 30.

The NAT operations of NAT engine 20 are performed using the IP source and destination addresses of packet 40 available at $T_1$, the protocol field in the IP header (available at the same time as the IP source and destination addresses), as well as some additional L4 information that is not available until $T_2$. This additional L4 information includes the TCP source and destination port numbers. It is to be noted that the TCP source and destination port numbers are received and available before the complete TCP header is available. As such, in the example of FIG. 1, the NAT engine 20 does not wait until the complete TCP header is available before beginning the NAT operations. Instead, the NAT engine 20 is configured to begin the NAT operations substantially immediately after the TCP source and destination port numbers of packet 40 are available. In other words, the NAT operations begin approximately at, or immediately after, $T_2$ and are performed in parallel with the forwarding operations.

ACLs are, in essence, sets of commands grouped together by a number or name that are used to filter traffic entering or leaving an interface of a network device, such as router 10. ACLs may be used to filter inbound traffic (as the traffic comes into an interface) or outbound traffic (before the traffic exits an interface) and, in such circumstances, are referred to as inbound and outbound ACLs, respectively. For both inbound and outbound ACLs, the IP addresses specified in the ACL depend on the interface where the ACL is applied. These IP addresses must be valid on the specific interface to which the ACL is attached, regardless of NAT. Additionally, ACL filtering takes precedence over NAT. That is, an ACL is evaluated first and then a NAT rule is applied to the packet.

The ACL operations at ACL engine 25 include ingress filtering of packet 40 and the identification of rules that may be applicable to packet 40, with reference to NAT operations. More specifically, the forwarding engine 15 is configured to determine the egress interface for packet 40. As such, the ACL engine 25 does not perform the actual field translations (because it does not know the egress port), but rather determines or sets one or more ACL rules for use by resolution engine 30 in performing the ACL filtering, if applicable. The ACL engine 25 provides an ACL result 90 to resolution engine 30 that identifies the one or more ACL rules. Specific filtering cases may include, for example, instructions to punt to supervisor, bypass NAT, drop, etc. The ACL result 90 may have a number of different formats. In certain examples, the ACL result 90 may be one or more bits that are forwarded to, and used by, the resolution engine 30.

The ACL operations of ACL engine 25 are performed using one or more pieces of the previously received L3 and/or L4 information, as well as some additional L4 information that is not available until $T_3$. This additional L4 information includes the TCP flags. As such, in the example of FIG. 1, the ACL engine 25 is configured to begin the ACL operations substantially immediately after the TCP flags of packet 40 are available. In other words, the ACL operations begin approximately at, or immediately after, $T_3$ and are performed in parallel with the forwarding and NAT operations.

In summary, there are three separate parallel processing paths (i.e., forwarding, NAT, and ACL) that can each be independently started when the last piece of relevant information becomes available. As used herein, the relevant information is the information that is used in the respective processing operations. As such, the relevant information for the forwarding operations is the IP source and destination addresses, the relevant information for the NAT operations is the TCP source and destination ports, and the relevant information for the ACL operations is the TCP flags.

Forwarding engine 15, NAT engine 20, and ACL engine 25 are each represented in FIG. 1 by an elongated block. The length of each block generally represents the relative time duration needed to complete the operations performed in the respective block. Therefore, as shown in FIG. 1, the forwarding operations take longer to complete than the NAT operations, while the NAT operations take longer to complete than the ACL operations. Therefore, by starting each of the forwarding, NAT, and ACL operations in the above described order as soon as the relevant information becomes available, the results of the three parallel operations can be provided to resolution engine 30 at substantially the same time, or at least without significant delays incurred during serialized operations, thereby increasing efficiency and reducing latency.

In the example of FIG. 1, the resolution engine 30 is configured to use the results 80, 85, and 90 from the forwarding engine 15, NAT engine 20, and ACL engine 25, respectively, to actually implement routing, ACL filtering, and NAT, as applicable. In other words, the resolution engine 30 is configured to leverage the information obtained during the parallel processing operations to implement (carry out) a routing decision and generate a routing result 100. The routing decision result 100 may take a number of different forms but may include, for example: (1) forwarding the packet 40 to a certain internal port (i.e., so NAT is not performed), (2) forwarding the packet 40 to a certain external port (i.e., so NAT is performed), (3) diverting the packet 40 to software for dynamic entries installment/removal, (4) diverting the packet 40 to software for software NAT, (5) dropping the packet 40, etc.

As noted, the results 80, 85, and 90 may each be one or more bits that are provided to the resolution engine 30. As such, in certain example, the routing result 100 is a multi-bit (e.g., two bit) output that is used for subsequent NAT.

In the example of FIG. 1, the NAT result 85 is qualified by the forwarding result 80 in that the forwarding result 80 includes an indication of whether the packet 40 is to undergo a NAT crossing. This indication represents the NAT configuration as either: NULL, INSIDE, or OUTSIDE. The same or different qualification may apply to specific NAT ACL rules deployed to steer packet 40 to software. Also in the example of FIG. 1, when the packet has been fully qualified and a NAT is performed, the NAT counter(s) 35 are incremented to provide accurate reporting of the NAT operations.

Furthermore, special ACLs may be used to send ('punt') packet 40 to a processor (not shown in FIG. 1) for performance of some NAT services. For example, in dynamic NAT on a TCP flow, software is used to dynamically allocate a global IP address from a pool. This relies upon a snoop of the TCP connection set and reset. In certain examples of FIG. 1, the ACL entry is simplified in that a TCP flow coming from a NAT inside interface with a TCP SYN, ACK or FIN flag set is punted to the processor. An efficient method will only punt packets to the processor when the packets are to cross a NAT border. In such an example, the ACL result 90 carries a qualify bit (qualify_with_NAT), and the final resolution honors the ACL action, based on NAT crossing criteria.

Another example of a type of packet that should be sent to a processor is a packet for which hardware cannot perform the NAT, such as packets implemented in accordance with the File Transfer Protocol (FTP). Again, a simple ACL and final resolution can achieve an efficient implementation for punting such packets to the processor.

As shown, the NAT counter(s) 35 are placed after the resolution engine 30 and are attached to the NAT translation rule so as to effectively count NAT packets. The counters are used in cases of dynamic NAT in order to age out stale entries from the NAT table.

Figure 2A:
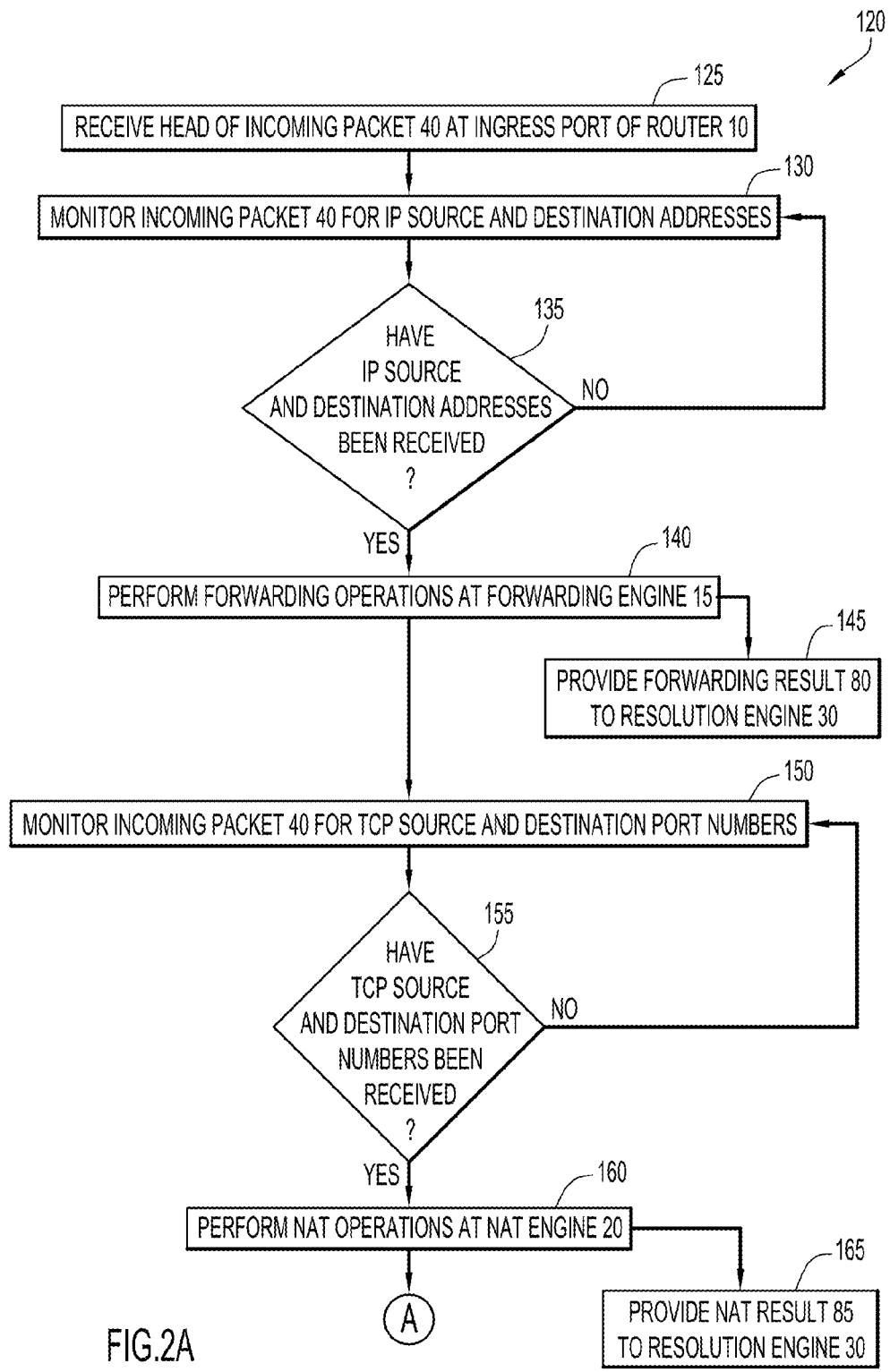
FIGS. 2A and 2B illustrate a flowchart of a method in accordance with examples presented herein.
Figure 2B:
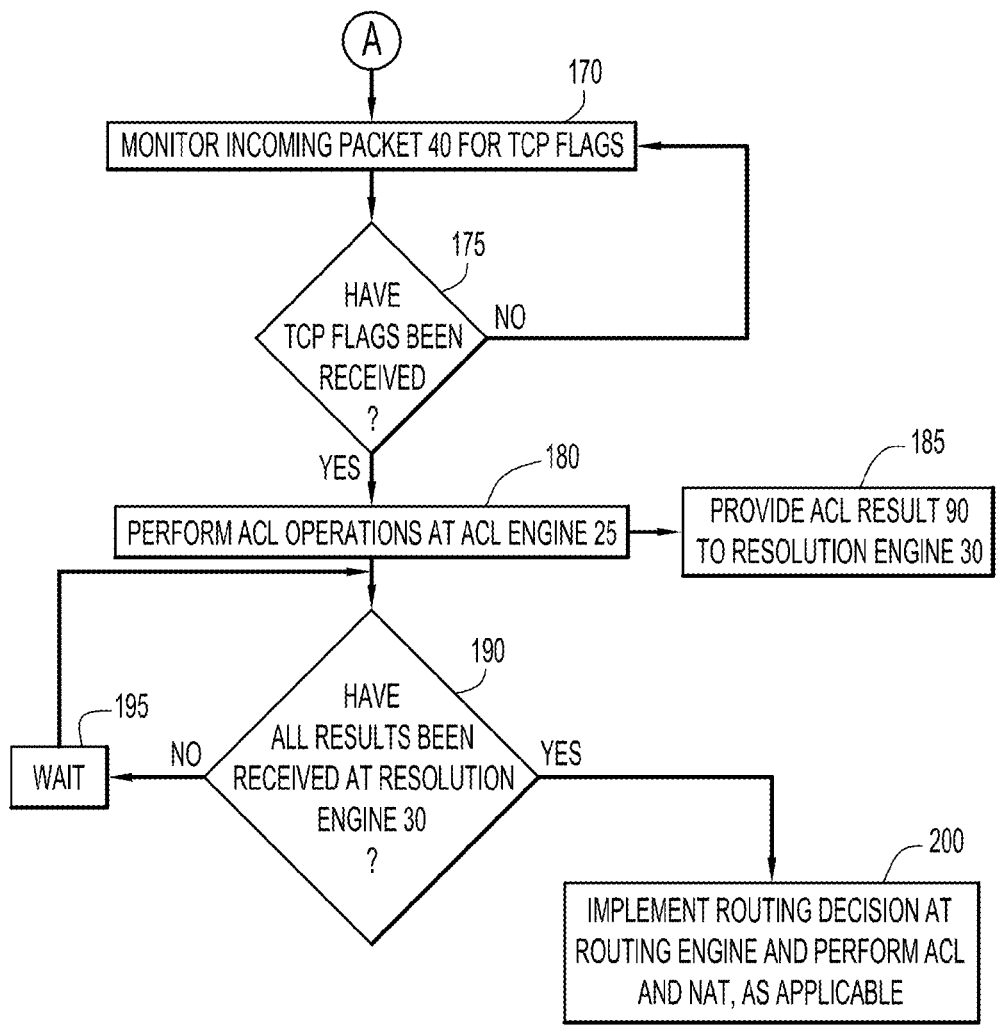

FIGS. 2A and 2B illustrate a flowchart of a method 120 in accordance with examples presented herein. For ease of description, method 120 is described with reference to FIG. 1. Method 120 begins at 125 where the head (beginning) of a packet 40 is received at an ingress port of router 10. At 130, the incoming packet 40 is monitored for L3 information, including the IP source and destination addresses of the packet. At 135, a determination is made as to whether the IP source and destination addresses of packet 40 have been received. If the IP source and destination addresses have not been received, the method 120 continues to monitor the packet 40. If it is determined at 135 that the IP source and destination addresses have been received, then at 140 the forwarding operations of forwarding engine 15 are performed. The forwarding operations generate a forwarding result 80 that, as noted above, identifies the egress interface for packet 40 and whether the packet 40 should undergo NAT. At 145, the forwarding result 80 is provided to resolution engine 30.

While the forwarding operations are performed at 140, the incoming packet 40 is monitored for the availability of the TCP source and destination port numbers at 150. At 155, a determination is made as to whether the TCP source and destination port numbers of packet 40 have been received. If the TCP source and destination port numbers have not been received, monitoring of the packet 40 continues. If it is determined at 135 that the TCP source and destination port numbers have been received, then at 160 the NAT operations of NAT engine 20 are performed. The NAT operations generate a NAT result 85 that, as noted above, identifies one or more NAT rules for possible application to packet 40. At 165, the NAT result 85 is provided to resolution engine 30.

While the NAT operations are performed at 160, the incoming packet 40 is monitored for the availability of the TCP flags at 170. At 175, a determination is made as to whether the TCP flags of packet 40 have been received. If the TCP flags have not been received, monitoring of the packet 40 continues. If it is determined at 175 that the TCP flags have been received, then at 180 the ACL operations of ACL engine 25 are performed. The ACL operations generate an ACL result 90 that, as noted above, identifies one or more ACL rules use by resolution engine 30 in performing ACL filtering. At 185, the ACL result 90 is provided to resolution engine 30.

At 190, a determination is made as to whether all of the forwarding, NAT, and ACL results have been received at resolution engine 30. If all results have not been received, the method 120 waits at 195. Once all results have been received, the resolution engine 30 implements the routing decision at 200 and performs the ACL filtering and the NAT, as applicable, to generate the routing result 100.

Figure 3:
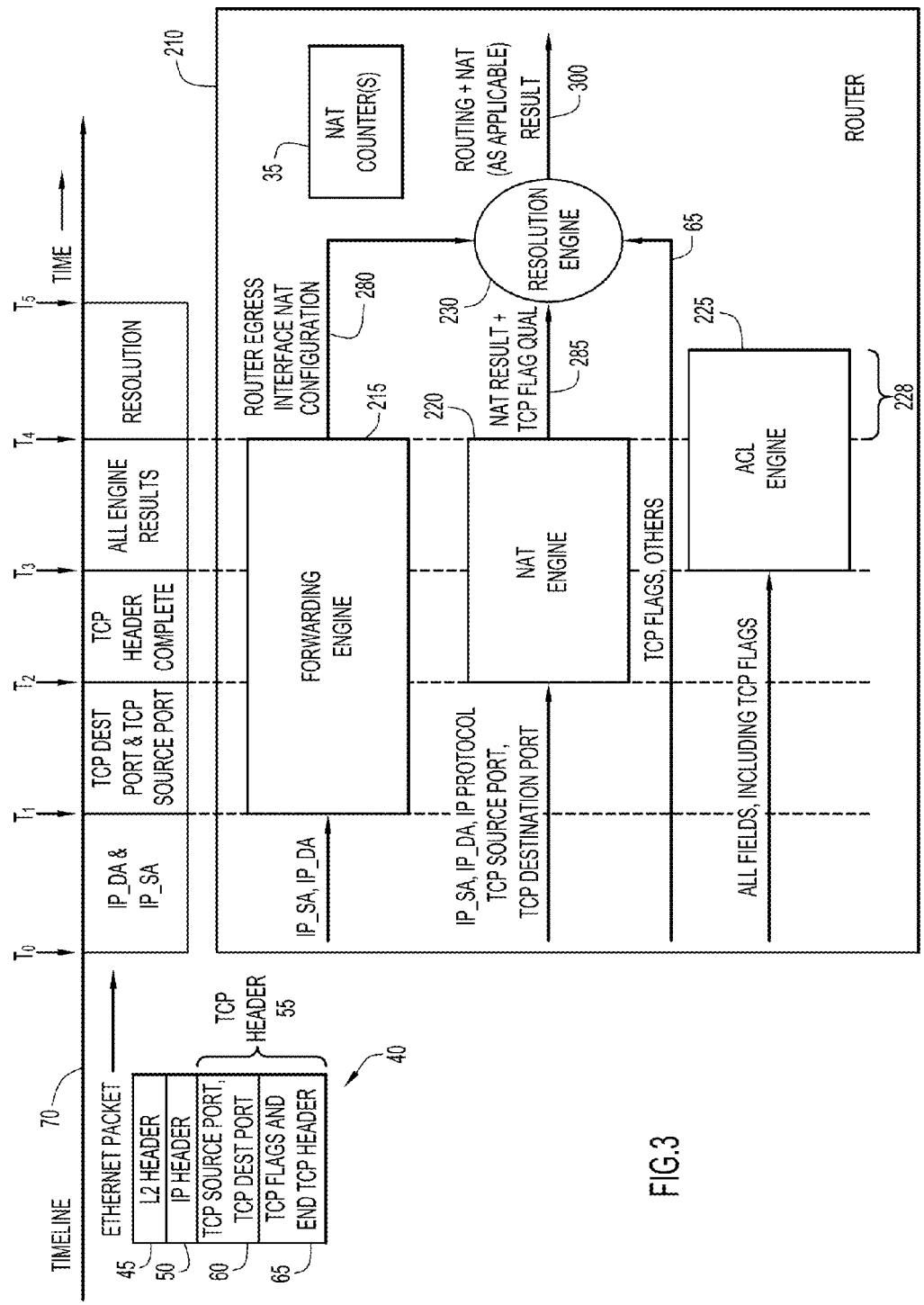
FIG. 3 is a schematic diagram of a networking device configured to perform parallel processing operations in accordance with examples presented herein.

FIG. 3 illustrates another example arrangement of a network device 210 which, in this example, is a router. The router 210 of FIG. 3 includes a forwarding engine 215, a NAT engine 220, an ACL engine 225, a resolution engine 230, and NAT counter(s) 235.

It is to be noted that FIG. 1 illustrates an implementation where the ACL operations are performed in a shorter time period than the NAT operations. As such, because the NAT operations are commenced prior to the ACL operations, the configuration of FIG. 1 results in the NAT result 85 and the ACL result 90 being provided to the resolution engine 30 at substantially the same time. In the example configuration of FIG. 3, the ACL operations and NAT operations are performed in substantially the same amount of time. As such, NAT engine 220 and ACL engine 225 are shown in FIG. 3 as having substantially the same length.

Router 210 includes a plurality of network interface ports (not shown in FIG. 3) where a packet 40 (described above) is received at an ingress port. As noted above, the information contained in packet 40 will become available for use by router 210 at different times. FIG. 3 also includes the timeline 70 that illustrates when various pieces of information in packet 40 become available for use by router 210.

FIG. 3 illustrates an example arrangement in which the parallel packet processing operations of forwarding, NAT, and ACL are performed by forwarding engine 215, NAT engine 220, and ACL engine 225, respectively. As described above, forwarding operations are performed using the IP source and destination addresses of packet 40, which are received and available at $T_1$, prior to the receipt and availability of the L4 information (e.g., TCP header). As such, the forwarding engine 215 is configured to begin the forwarding operations substantially immediately after the IP source and destination addresses of packet 40 are available (i.e., at $T_1$). At the conclusion of the forwarding operations, the forwarding engine 215 provides a forwarding result 280 to the resolution engine 230. The forwarding result 280 identifies the egress interface for packet 40 and whether the packet 40 should undergo NAT.

Similar to the example of FIG. 1, the NAT operations of NAT engine 220 do not include the actual translation of fields in packet 40. Rather, the NAT operations of NAT engine 220 include the generation of one or more NAT rules that may be applicable to packet 40 if the packet is to be routed from an internal interface to an external interface. More specifically, the forwarding engine 215 is configured to determine the egress interface for packet 40, thereby determining if the packet is to undergo a NAT crossing. As such, the NAT engine 220 does not perform the actual field translations (because it does not know if a NAT crossing will occur), but rather determines or sets one or more NAT rules for use by resolution engine 230 in performing the NAT, if applicable. The NAT engine 220 provides a NAT result 285 to resolution engine 230 that identifies the one or more NAT rules.

The NAT operations of NAT engine 220 are performed using the IP source and destination address of packet 40 available at $T_1$, the protocol field in the IP header), as well as some additional L4 information that is not available until $T_2$. This additional L4 information includes the TCP source and destination port numbers. It is to be noted that the TCP source and destination port numbers are received and available before the complete TCP header is received. As such, in the example of FIG. 3, the NAT engine 220 does not wait until the complete TCP header is received before beginning the NAT operations. Instead, the NAT engine 220 is configured to begin the NAT operations substantially immediately after the TCP source and destination port numbers of packet 40 are available (i.e., at $T_2$).

As noted above, the NAT operations of NAT engine 220 and the ACL operations of ACL engine 220 in FIG. 3 take approximately the same amount of time to complete. However, also as noted, the information used to perform the ACL processing is received after the information used to perform the NAT processing. As such, ACL processing cannot begin until at least a period of time (i.e., the time between $T_2$ and $T_3$ in timeline 70) after start of the NAT processing. As such, any result of the ACL processing will not be available until after the NAT result 285 and the forwarding result 280. That is, the length of the ACL processing introduces a delay into the routing path where the resolution engine 230 would have the forwarding result 280 and the NAT result 285, but not the ACL result. Such a delay inherently increases the latency of router 210.

To prevent the duration of the ACL processing from increasing the latency of router 210, the arrangement of FIG. 3 is configured to bypass the ACL engine 225. More specifically, in the example of FIG. 3, the raw (unprocessed) TCP flags 65 are provided to the resolution engine 230 upon becoming available at $T_3$. Additionally, the NAT result 285 includes, along with the one or more NAT rules, one or more TCP flag qualifications. That is, the NAT rules and/or application thereof by resolution engine 230 are qualified (i.e., are adjusted based on) the TCP flags 65. As such, the resolution engine 230 can implement ACL filtering based on these qualifications, and does not need to wait for the completion of the ACL operations and an ACL result. The TCP qualifications may take different forms such as, for example, instructions to put to the supervisor (i.e., punt if a TCP.SYN flag is set), copy to supervisor (i.e., copy if a TCP.RST flag is set), copy to supervisor (i.e., copy if TCP.FIN is set), drop if there is an illegal combination of TCP flags, etc.

In the example of FIG. 3, the resolution engine 230 is configured to use the results 280 and 285 from the forwarding engine 215, NAT engine 220, respectively, as well as the TCP flags to actually implement ACL filtering, NAT and forwarding. In other words, the resolution engine 230 is configured to leverage the information obtained during the parallel processing operations to implement (carry out) a routing decision and generate a routing result 300. Similar to the example of FIG. 1, the routing result 300 may take a number of different forms but may include, for example: (1) forwarding the packet 40 to a certain internal port (i.e., such that NAT is not performed), (2) forwarding the packet 40 to a certain external port (i.e., such that NAT is performed), (3) diverting the packet 40 to software for dynamic entries installment/removal, (4) diverting the packet 40 to software for software NAT, (5) dropping the packet 40, etc.

In the example of FIG. 3, the NAT result 285 is qualified by the TCP flags 65 as well as the forwarding result 280 that determines if a NAT crossing occurs. The same or different qualification may apply to specific NAT ACL rules deployed to steer packet 40 to software. Also in the example of FIG. 3, when the packet 40 has been fully qualified and a NAT is performed, the NAT counter(s) 235 are incremented to provide accurate reporting of the NAT operations.

Figure 4A:
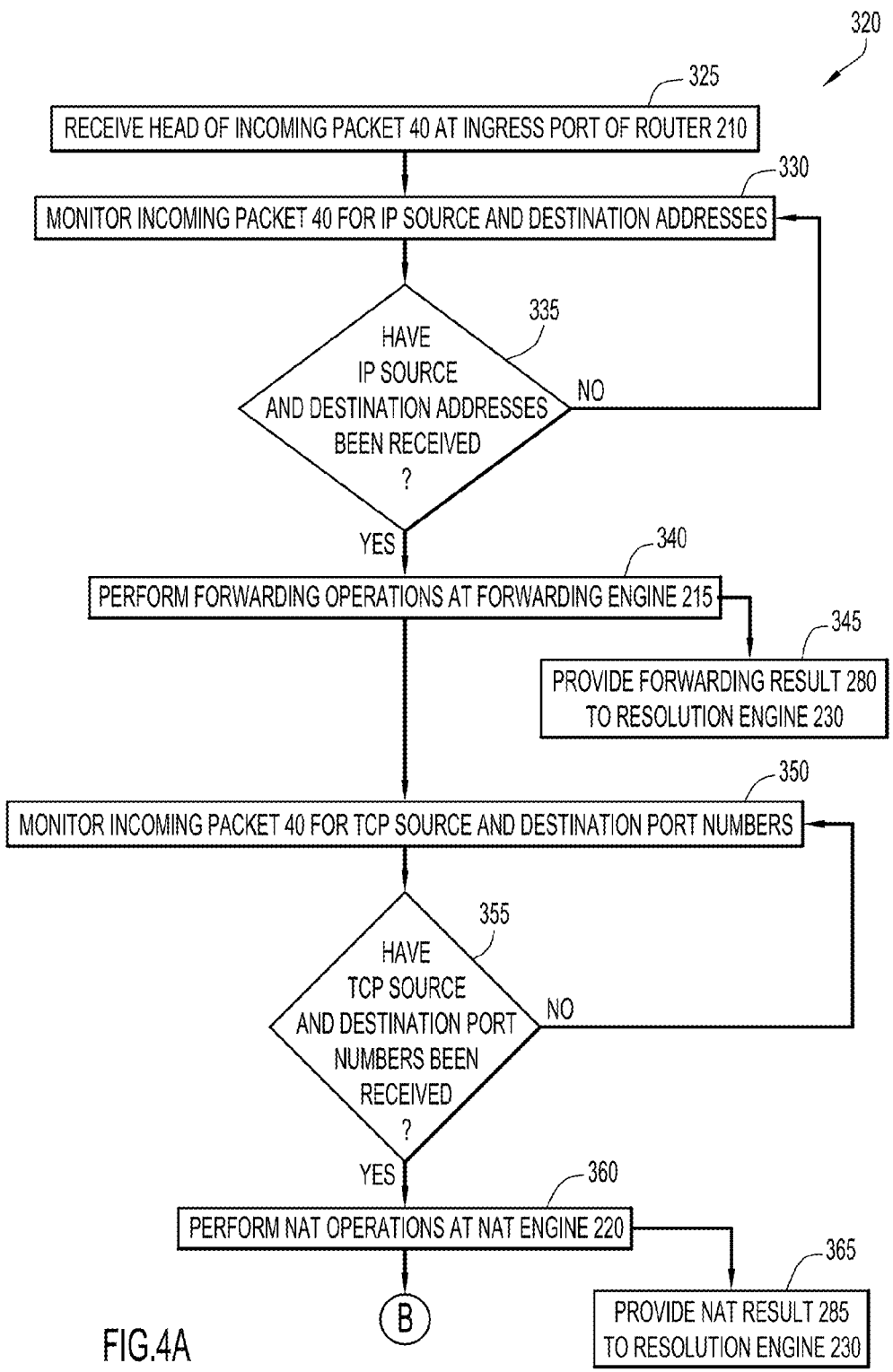
FIGS. 4A and 4B illustrate a flowchart of a method in accordance with examples presented herein.
Figure 4B:
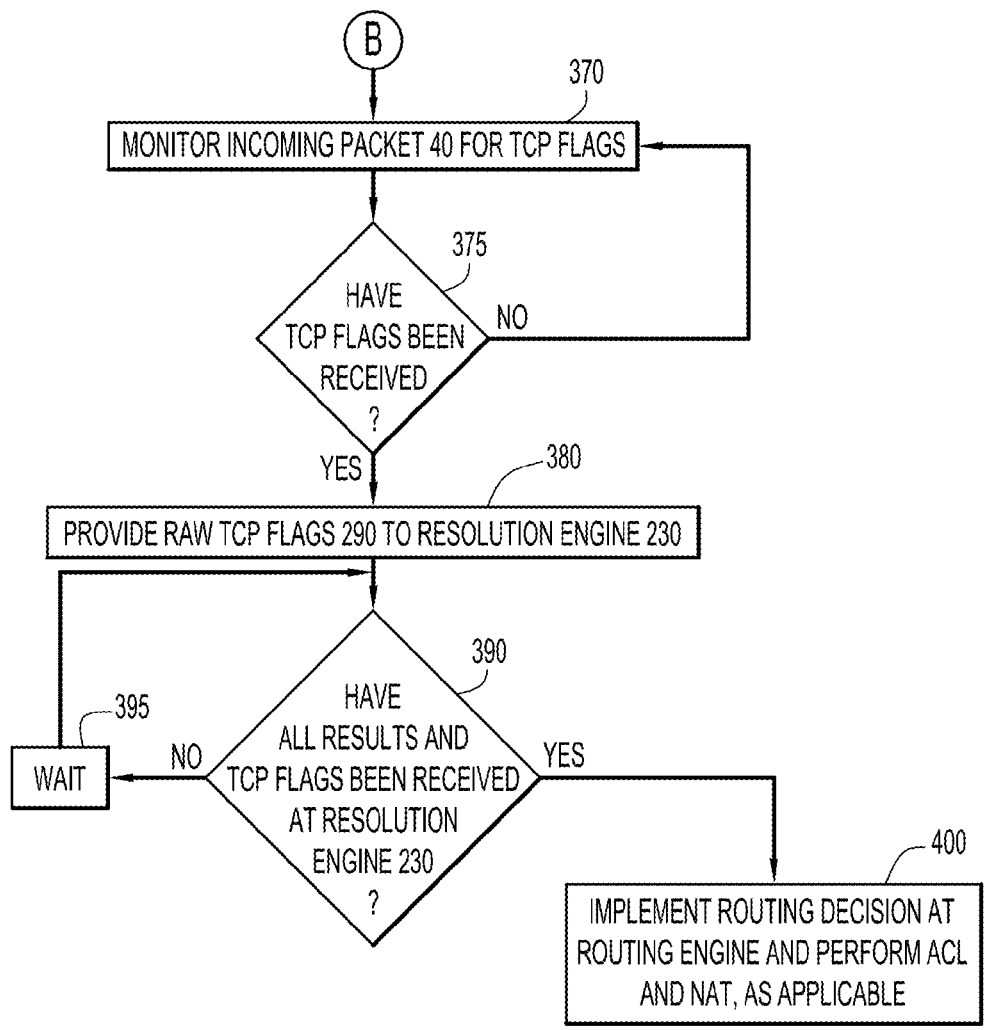

FIGS. 4A and 4B illustrate a flowchart of a method 320 depicting operational flow in accordance with the configuration of FIG. 3. Method 320 begins at 325 where the head of a packet 40 is received at an ingress port of router 210. At 330, the incoming packet 40 is monitored for L3 information, including the IP source and destination addresses of the packet. At 335, a determination is made as to whether the IP source and destination addresses of packet 40 have been received. If the IP source and destination addresses have not been received, the method 320 continues to monitor the packet 40. If it is determined at 335 that the IP source and destination addresses have been received, then at 340 the forwarding operations of forwarding engine 215 are performed. The forwarding operations generate a forwarding result 280 that, as noted above, identifies the egress interface for packet 40 and whether the packet 40 should undergo NAT. At 345, the forwarding result 280 is provided to resolution engine 230.

While the forwarding operations are performed at 340, the incoming packet 40 is monitored for the availability of the TCP source and destination port numbers at 350. At 355, a determination is made as to whether the TCP source and destination port numbers of packet 40 have been received. If the TCP source and destination port numbers have not been received, the monitoring of the packet 40 continues. If it is determined at 335 that the TCP source and destination port numbers have been received, then at 360 the NAT operations of NAT engine 220 are performed. The NAT operations generate a NAT result 285 that, as noted above, identifies one or more NAT rules for possible application to packet 40. The NAT result 285 also includes one or more TCP flag qualifications. At 365, the NAT result 285 is provided to resolution engine 230.

While the NAT operations are performed at 360, the incoming packet 40 is monitored for the availability of the TCP flags at 370. At 375, a determination is made as to whether the TCP flags 65 of packet 40 have been received. If the TCP flags 65 have not been received, the method 320 continues to monitor the packet 40. If it is determined at 375 that the TCP flags 65 have been received, then at 380 the raw TCP flags 65 are provided to the resolution engine 230.

At 390, a determination is made as to whether all of the forwarding result 280, the NAT result 285, and the TCP flags 65 have been received at resolution engine 230. If all of this information has not been received, the method 320 waits at 395. Once all of this information has been received, the resolution engine 230 implements the routing decision at 400 and performs the ACL filtering and the NAT, as applicable, to generate the routing result 300.

It is to be appreciated that the length of the ACL operations may vary depending on various criteria. For example, ACL operations may include operations such as matching ranges of TCP ports, matching security groups, matching compressed values of IP addresses, etc. In certain examples, the ACL operations may be performed rapidly. However, in examples where scalability is important, the derivations can incur some substantial latency because they use one or multiple additional table lookups.

It is to be appreciated that the operations of FIGS. 2 and 3 are not mutually exclusive and may be performed within the same device. That is, a single router or other networking device may be configured to operate as shown and described with reference to FIGS. 1 and 2 and as shown and described with reference to FIGS. 3 and 4, under different circumstances.

L3 and L4 headers each have a checksum that operates as a safety mechanism against data corruption. As such, if information in an L3 or L4 header is changed through, for example, a NAT, than the checksum should also be changed. In certain examples, a checksum can be updated based on an incremental update technique where, instead of calculating a completely new checksum based on all fields, a checksum is only calculated for the changed fields. For example, in an arrangement where NAT is performed to change an IP source address, an incremental checksum is created based only on the difference between the new and old IP source addresses.

Figure 5:
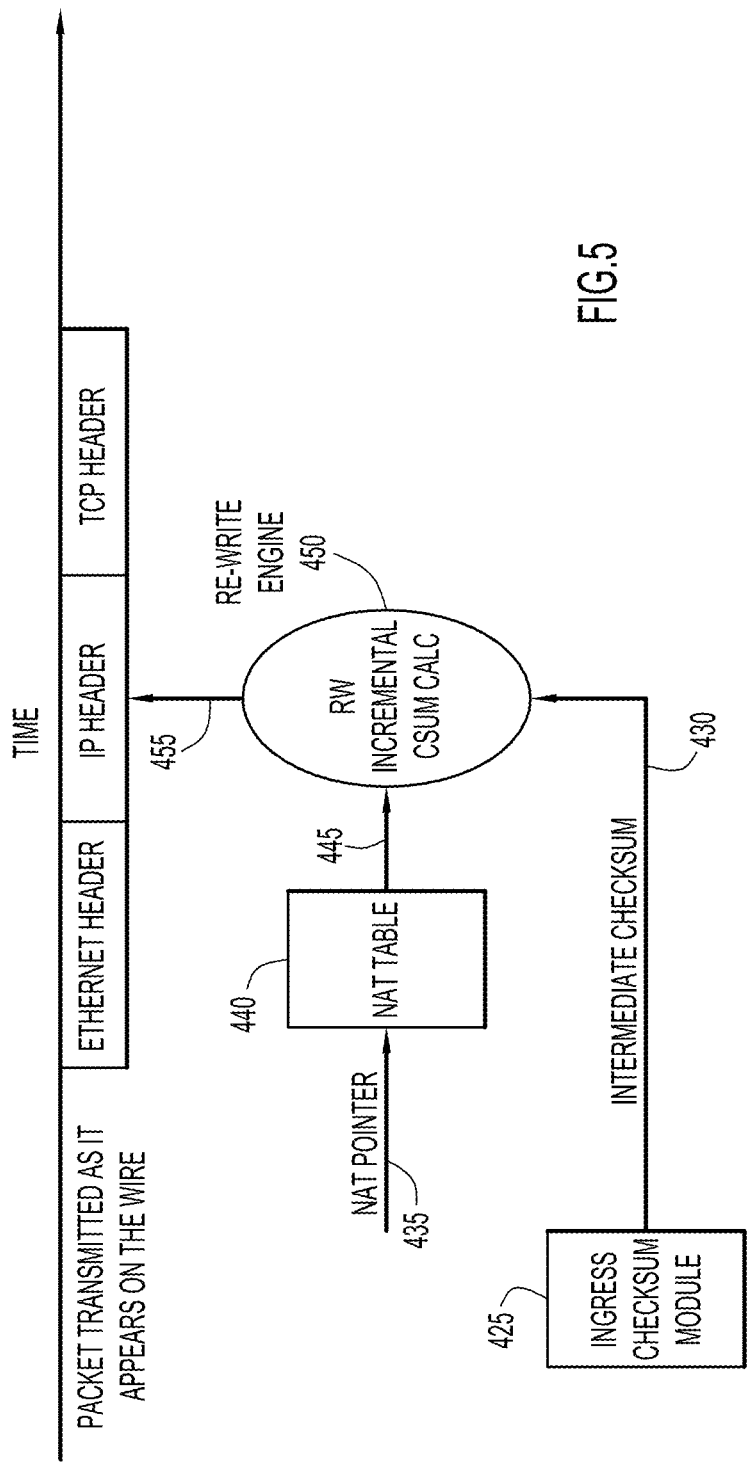
FIG. 5 is a schematic diagram illustrating the determination of an incremental checksum in accordance with examples presented herein.

In conventional arrangements, an incremental checksum is computed by a re-write engine based on the ingress (original) information as well as the egress (new) information (e.g., the new and original IP source addresses). In such conventional arrangements, a re-write engine obtains the ingress information through a table access operation. However, this table access operation takes a certain period of time to complete that accordingly increases the latency of the packet routing operations. FIG. 5 is a schematic diagram illustrating example elements of a networking device in which an incremental checksum may be computed without obtaining the original information through a table access More particularly, in the example of FIG. 5 the networking device includes an ingress checksum module 425 that computes an intermediate checksum 430 upon the ingress of a packet. This intermediate checksum 430 is logically the same as computing a difference between the checksum in the packet and the ingress information.

The intermediate checksum 430 is provided to a re-write engine 450 at the egress. A pointer 435 is passed to the NAT table 440. As a result, re-write engine 450 is provided with the egress information (i.e., the new information that was changed through the NAT operation, and which is the cause for the incremental checksum). Accordingly, the re-write engine 450 has the intermediate checksum 430 and the egress information 445. The re-write engine 450 is configured to perform an operation that is logically the same as computing a sum 455 of the intermediate checksum 430 and the egress information 445. This resulting sum 455 is the incremental checksum value that can then be written into the packet to update the checksum. As such, in the example of FIG. 5, the incremental checksum 455 is computed without the re-write engine 450 having to obtain the ingress information, thereby reducing the time needed to perform the checksum update operations. These incremental checksum calculations and re-write operations may occur in parallel with the resolution operations of FIGS. 1 and 3.

Figure 6:
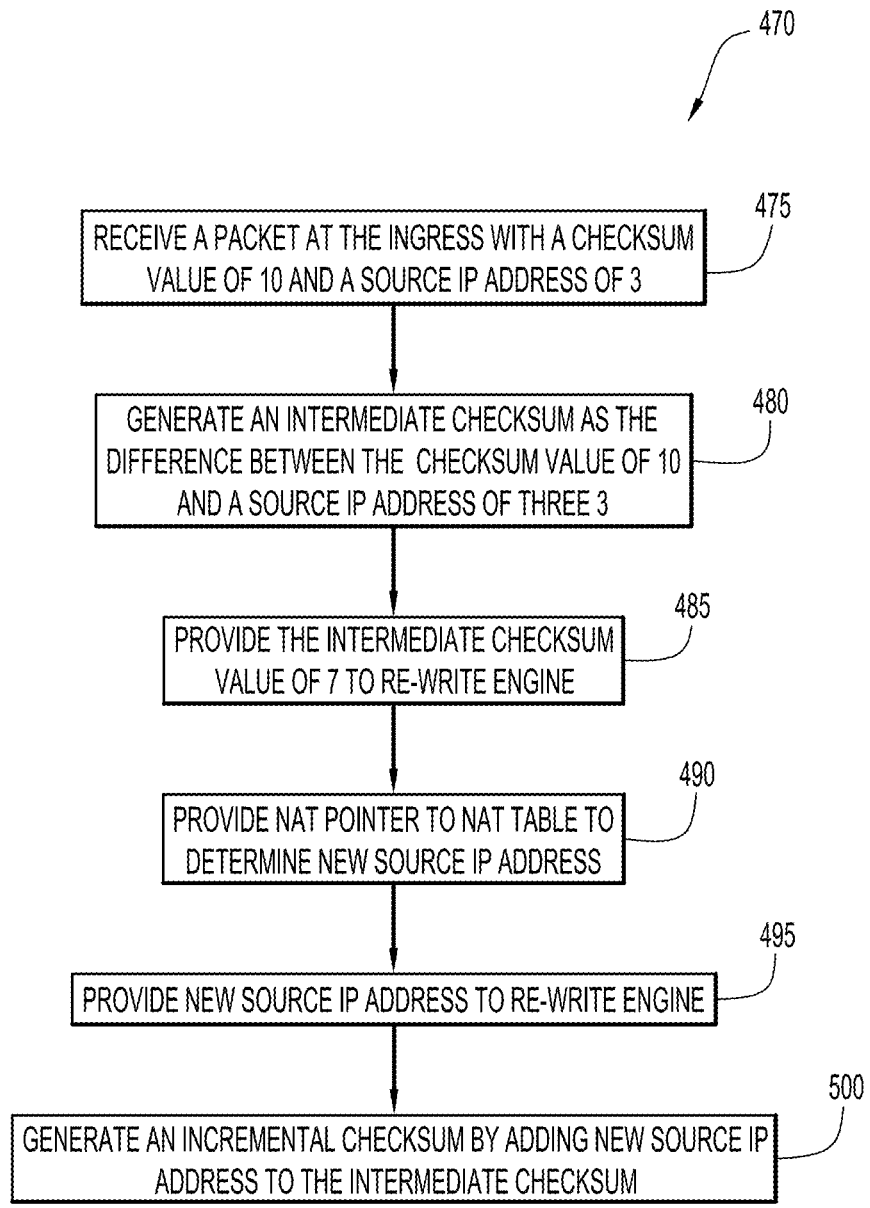
FIG. 6 is a flowchart illustrating a method for determining an incremental checksum in accordance with examples presented herein.

FIG. 6 is a flowchart of a method 470 to compute an incremental checksum after a change of a source IP address in accordance with examples presented herein. To facilitate understanding of this example, simplified numerical values are provided. It is to be appreciated that these values are merely for purposes of illustration and do not reflect actual values used in practice.

Method 470 begins at 475 wherein a packet that includes a checksum value of ten (10) and a source IP address value of three (3) is received at an ingress. At 480, a difference between the checksum value of 10 and the source IP address value of 3 is computed, yielding a value of seven (7). This value of 7 is the intermediate checksum value. At 485, the intermediate checksum value 7 is provided to a re-write engine.

At 490, a pointer is passed to a NAT table and, as a result, at 495 the new source IP address is provided to the re-write engine. In this example, the new source IP address value is five (5). At 500, the re-write engine computes a sum of the intermediate checksum value 7 and the new source IP address value 5 to obtain a value of twelve (12). This value of 12 is the incremental checksum value that can then be written into the packet to update the checksum.

Figure 7:
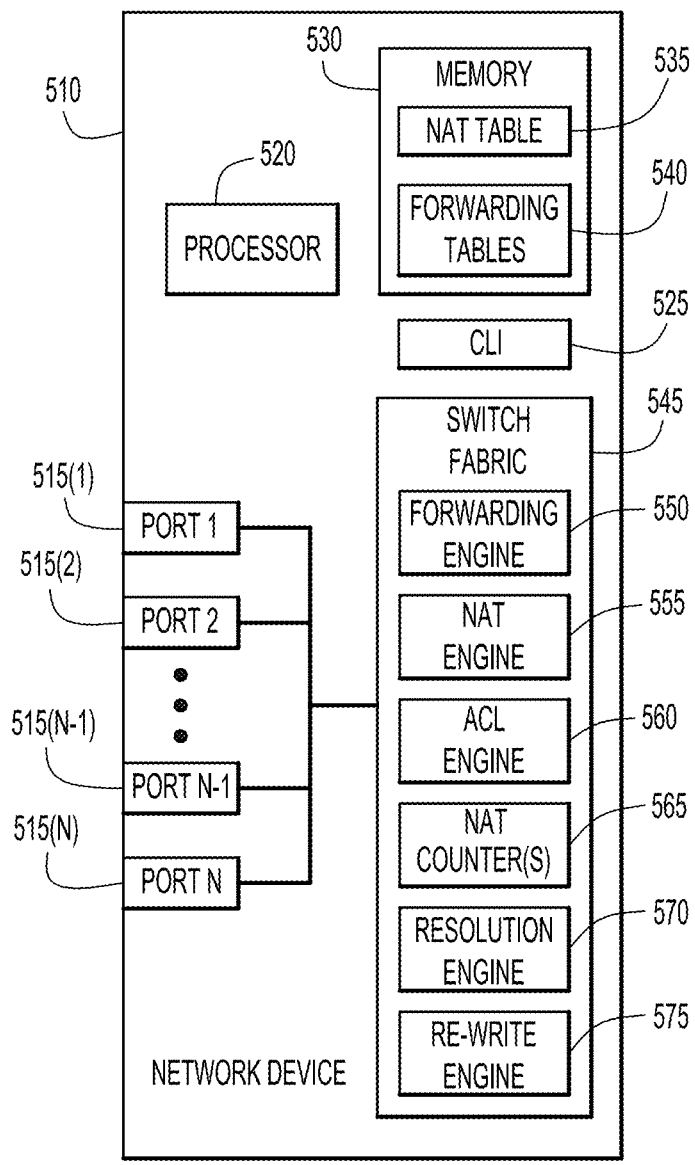
FIG. 7 is a block diagram of a network device in accordance with examples presented herein.

FIG. 7 is a block diagram of a networking device 510 in accordance with examples presented herein. Networking device 510 may be, for example, a router, a multi-layer switch, etc.

As shown, networking device 510 comprises a plurality of network interface ports 515(1)-515(N), a processor 520, a command-line interface (CLI) 525, a memory 530, and a switch fabric 545. The memory 530 comprises, among other elements, a NAT table 535 and forwarding tables 540. Switch fabric 545 comprises, among other elements, a forwarding engine 550, a NAT engine 555, an ACL engine 560, one or more NAT counter(s) 565, a resolution engine 570, and a re-write engine 575. The memory 540 may reside within the switch fabric 545.

As noted above, the various examples of FIGS. 1 and 2, FIGS. 3 and 4, and FIGS. 5 and 6 are not mutually exclusive. As such, the networking device 510 and, more particularly, the forwarding engine 550, NAT engine 555, ACL engine 560, NAT counter(s) 565, resolution engine 570, and re-write engine 575 may each be configured to operate in accordance with any of the above examples.

The memory 530 may comprise read only memory (ROM), random access memory (RAM), magnetic disk storage media devices, optical storage media devices, flash memory devices, electrical, optical, or other physical/tangible memory storage devices. Processor 520 is, for example, a microprocessor or microcontroller. In the example of FIG. 7, the forwarding engine 550, NAT engine 555, ACL engine 560, NAT counter(s) 565, resolution engine 570, and re-write engine 575 are all implemented in hardware (i.e., they are hardware-based elements, such as digital logic gates in one or more application-specific integrated circuits (ASICs)). In other examples, one or more of these elements may be implemented partially or fully in software.

Figure 8:
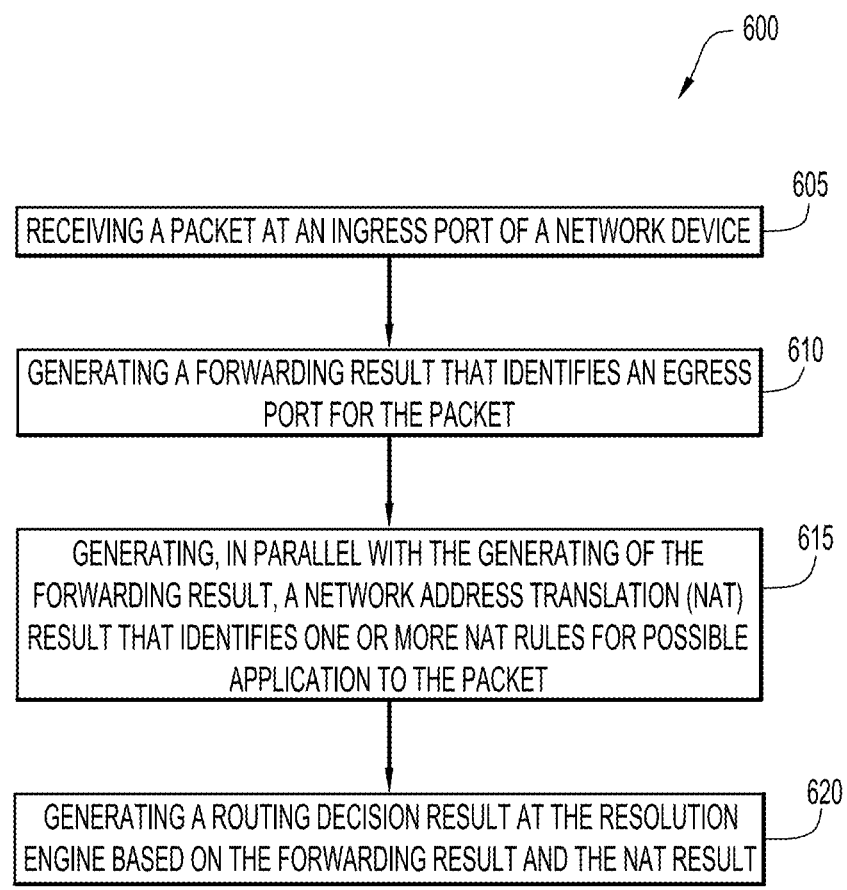
FIG. 8 is a high-level flowchart in accordance with examples presented herein.

FIG. 8 is a high-level flowchart of a method 600 in accordance with examples presented herein. Method 600 begins at 605 where a packet is received at an ingress port of a networking device. At 610, a forwarding result that identifies an egress port for the packet is generated. At 615, in parallel with the generating of the forwarding result, a NAT result is generated that identifies one or more NAT rules for possible application to the packet. At 620, a routing decision result is generated at the resolution engine based on the forwarding result and the NAT result.

Presented herein are techniques to reduce latency in multiple stages of the NAT processing in a networking device such as a multilayer switch or router. In particular, the techniques leverage parallel forwarding, NAT and ACL processing, followed by a fast stage of final merging to determine the final routing decision result. The techniques also involve processing while parsing to reduce the store and forward latency of full packet headers, may use post qualification to start processing before receiving all packet data, and may use an incremental checksum calculation to minimize re-write latency.

The above description is intended by way of example only.

What is claimed is:
1. A method comprising:
receiving a packet at an ingress port of a network device,
generating with a first hardware element a forwarding result that identifies an egress port for the packet based on information of a header of the packet;
generating with a second hardware element that operates independently of and in parallel with the first hardware element a network address translation (NAT) result based on information of a header of the packet, the NAT result identifying one or more NAT rules for possible application to the packet, and wherein generating the NAT result with the second hardware element begins once information of the header of the packet relevant to the NAT result is received;
wherein the generating of the forwarding result is initiated prior to the generating of the NAT result;
generating, with a third hardware element, a routing decision result based on the forwarding result and the NAT result; and
generating address information for the packet based on the NAT result.

2. The method of claim 1, further comprising:
generating with a fourth hardware element and in parallel with the generating of the forwarding result and the NAT result, an access control list (ACL) result that identifies one or more ACL rules; and
generating the routing decision result with the third hardware element based on the forwarding result, the NAT result, and the ACL result.

3. The method of claim 1, wherein the packet is a Transmission Control Protocol (TCP) packet, and further comprising:
obtaining one or more TCP flags; and
generating with the third hardware element the routing decision result based on the forwarding result, the NAT result, and the TCP flags.

4. The method of claim 1, wherein the packet comprises an Internet Protocol (IP) header that includes an IP source address and an IP destination address, and a TCP header that includes a TCP source port number, a TCP destination port number, and TCP flags, further comprising:
receiving with the first hardware element the IP source address and an IP destination address prior to receipt of the TCP header; and
initiating the generating of the forwarding result prior to receipt by the second hardware element of the TCP header.

5. The method of claim 4, further comprising the second hardware element:
receiving the TCP source port number and the TCP destination port number prior to receipt of the TCP flags; and
initiating the generating of the NAT result prior to receipt of the TCP flags.

6. The method of claim 1, further comprising a fourth hardware element:
generating an intermediate checksum based on information in the packet when the packet is received at the ingress port;
forwarding the intermediate checksum to a re-write hardware element;
determining that a value of a selected field in the packet that is changed as a result of a NAT operation;
forwarding a new value for the selected field to the re-write hardware element; and
generating with the re-write hardware element, based only on the intermediate checksum and the new value for the selected field, an incremental checksum for addition to the packet at an egress port.

7. The method of claim 6, wherein generating the intermediate checksum with the fourth hardware element comprises:
computing a difference between a checksum in the packet when it is received at the ingress port and an original value for the selected field in the packet.

8. The method of claim 6, wherein generating the incremental checksum with the re-write hardware element comprises:
computing a sum between the intermediate checksum and the new value for the selected field.

9. The method of claim 1, wherein generating the NAT result comprises:
determining sets of NAT rules without performing an address translation.

10. The method of claim 1, further comprising:
determining whether the network address translation is performed depending on whether the egress port for the packet is an external port or an internal port.

11. An apparatus comprising:
one or more network interface ports configured to receive packets from a network and to send packets to the network;
a first hardware element configured to generate a forwarding result that identifies an egress port for a packet based on header information for the packet;
a second hardware element that operates independently of and in parallel with the first hardware element to generate a network address translation (NAT) result based on header information of the packet, the NAT result identifying one or more NAT rules for possible application to the packet, and wherein generation of the NAT result begins once header information of the packet relevant to the NAT result is received, and wherein address information for the packet is generated based on the NAT result;
a third hardware element configured to generate a routing decision result based on the forwarding result and the NAT result;
wherein the first hardware element initiates generating of the forwarding result prior to the second hardware element generating the NAT result.

12. The apparatus of claim 11, further comprising:
a fourth hardware element that operates independently of and in parallel with the first hardware element and the second hardware element and is configured generate an access control list (ACL) result that identifies one or more ACL rules; and
wherein the third hardware element is configured to generate the routing decision result based on the forwarding result, the NAT result, and the ACL result.

13. The apparatus of claim 11, wherein the packet is a Transmission Control Protocol (TCP) packet that includes one or more TCP flags and the third hardware element is configured to generate the routing decision result based on the forwarding result, the NAT result, and the TCP flags.

14. The apparatus of claim 11, wherein the packet comprises an Internet Protocol (IP) header that includes an IP source address and an IP destination address, and a TCP header that includes a TCP source port number, a TCP destination port number, and TCP flags, and wherein the first hardware element is further configured to:
receive the IP source address and an IP destination address prior to the second hardware element receiving the TCP header.

15. The apparatus of claim 14, wherein the second hardware element is further configured to:

receive the TCP source port number and the TCP destination port number prior to receipt of the TCP flags; and
initiate the generating of the NAT result prior to receipt of the TCP flags.

16. The apparatus of claim 11, further comprising a fourth hardware element configured to:
generate an intermediate checksum based on information in the packet when the packet is received at the ingress port;
forward the intermediate checksum to a re-write hardware element;
determine that a value of a selected field in the packet that is changed as a result of a NAT operation;
forward a new value for the selected field to the re-write hardware element; and
wherein the re-write hardware element is configured to generate, based only on the intermediate checksum and the new value for the selected field, an incremental checksum for addition to the packet at an egress port.

17. The apparatus of claim 16, wherein the fourth hardware element is configured to generate the intermediate checksum by:
computing a difference between a checksum in the packet when it is received at the ingress port and an original value for the selected field in the packet.

18. The apparatus of claim 16, wherein to generate the incremental checksum the re-write hardware element is configured to:
compute a sum between the intermediate checksum and the new value for the selected field.

19. The apparatus of claim 11, wherein, to generate the NAT result, the second hardware element is further configured to:
determine sets of NAT rules without performing an address translation.

20. The apparatus of claim 11, wherein the second hardware element is further configured to:
determine whether the network address translation is performed depending on whether the egress port for the packet is an external port or an internal port.

21. One or more non-transitory computer readable storage media encoded with software comprising executable instructions and when the instructions are executed operable to cause a plurality of hardware elements to:
receive a packet at an ingress port of a network device,
generate with a first hardware element a forwarding result that identifies an egress port for the packet based on information of a header of the packet;
generate with a second hardware element that operates independently of and in parallel with the first hardware element a network address translation (NAT) result based on information of a header of the packet, the NAT result identifying one or more NAT rules for possible application to the packet, and the second hardware element begins generation of the NAT result once information of the header of the packet relevant to the NAT result is received, and wherein address information for the packet is generated based on the NAT result; and
generate, with a third hardware element, a routing decision result based on the forwarding result and the NAT result,
wherein the first hardware element initiates generation of the forwarding result prior to the second hardware element generating of the NAT result.

22. The non-transitory computer readable storage media of claim 21, further comprising instructions operable to:
generate with a fourth hardware element that operates independently of an in parallel with the fourth hardware element and the second hardware to generate an access control list (ACL) result that identifies one or more ACL rules; and wherein the third hardware element is configured to generate the routing decision result based on the forwarding result, the NAT result, and the ACL result.

23. The non-transitory computer readable storage media of claim 21, wherein the packet is a Transmission Control Protocol (TCP) packet, and further comprising instructions operable to:

obtain one or more TCP flags; and generate the routing decision result based on the forwarding result, the NAT result, and the TCP flags.

24. The non-transitory computer readable storage media of claim 21, wherein the packet comprises an Internet Protocol (IP) header that includes an IP source address and an IP destination address, and a TCP header that includes a TCP source port number, a TCP destination port number, and TCP flags, further comprising instructions operable to:

receive at the first hardware element the IP source address and an IP destination address prior to receipt of the TCP header; and initiate the generation of the forwarding result prior to the second hardware element receipt of the TCP header.

25. The non-transitory computer readable storage media of claim 24, further comprising instructions operable to:

receive at the second hardware element the TCP source port number and the TCP destination port number prior to receipt of the TCP flags; and initiate the generating of the NAT result prior to receipt of the TCP flags.

26. The non-transitory computer readable storage media of claim 21, further comprising instructions operable to, with the fourth hardware element:

generate an intermediate checksum based on information in the packet when the packet is received at the ingress port;

forward the intermediate checksum to a re-write hardware element;

determine that a value of a selected field in the packet that is changed as a result of a NAT operation;

forward a new value for the selected field to the re-write hardware element; and generate with the re-write hardware element, based only on the intermediate checksum and the new value for the selected field, an incremental checksum for addition to the packet at an egress port.

27. The non-transitory computer readable storage media of claim 26, wherein the instructions operable to generate the intermediate checksum comprise instructions operable to:

compute, with the fourth hardware element, a difference between a checksum in the packet when it is received at the ingress port and an original value for the selected field in the packet.

28. The non-transitory computer readable storage media of claim 26, wherein the instructions operable to generate the incremental checksum comprise instructions operable to:

compute, with the rewrite hardware element, a sum between the intermediate checksum and the new value for the selected field.

29. The non-transitory computer readable storage media of claim 21, wherein the instructions operable for the second hardware element to generate the NAT result comprise instructions for the second hardware element to:

determine sets of NAT rules without performing an address translation.

30. The non-transitory computer readable storage media of claim 21, further comprising instructions for the second hardware element to:

determine whether the network address translation is performed depending on whether the egress port for the packet is an external port or an internal port.

\* \* \* \* \*